US012124516B1

(12) United States Patent
Granit et al.

(10) Patent No.: US 12,124,516 B1
(45) Date of Patent: Oct. 22, 2024

(54) METHODS FOR DISCOVERY OF NEW AUTOMATION ROUTINE TYPES

(71) Applicant: NICE LTD., Ra'anana (IL)

(72) Inventors: Oz Granit, Ramat-Gan (IL); Yuval Shachaf, Tzur Moshe (IL); Eran Roseberg, Hogla (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 18/455,361

(22) Filed: Aug. 24, 2023

(51) Int. Cl.
G06F 16/903 (2019.01)

(52) U.S. Cl.
CPC .............................. G06F 16/90344 (2019.01)

(58) Field of Classification Search
USPC ......................................................... 707/776
See application file for complete search history.

(56) References Cited

U.S. PATENT DOCUMENTS

| 8,407,176 | B2 * | 3/2013 | Boettcher | ............. | H04L 41/064 |
| | | | | | 706/47 |
| 2015/0088799 | A1 * | 3/2015 | Zhou | .................... | G06Q 10/101 |
| | | | | | 706/46 |
| 2015/0242493 | A1 * | 8/2015 | Misra | .................. | G06F 16/3338 |
| | | | | | 707/727 |

OTHER PUBLICATIONS

Andre DeHon; Design Patterns for Reconfigurable Computing;IEEE; pp. 1-11 (Year: 2004).*

* cited by examiner

*Primary Examiner* — Albert M Phillips, III
*Assistant Examiner* — Jermaine A Mincey
(74) *Attorney, Agent, or Firm* — Haynes and Boone, LLP

(57) ABSTRACT

A system to create new automation routines includes a processor to: Over time, store a group of actions taken by a group of agents within applications. From the stored group of actions, identify a repeating pattern of actions in a subset of the applications, and construct a binary vector, each position within the binary vector storing a 1 for an occurrence of any action within any application of the subset, and a 0 otherwise. From the binary vector and the repeating pattern, extract a sentence including at least one action within at least one application. Based on the repeating pattern, an application type, or a business goal, create a constraint. If the sentence meets the constraint, accept the sentence and add it to a pool of accepted sentences. From the pool of accepted sentences, identify a pattern of occurrences of the accepted sentence, and create a new automation routine.

20 Claims, 18 Drawing Sheets

METHODS FOR DISCOVERY OF NEW AUTOMATION ROUTINE TYPES

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The subject matter described herein relates to a device/method for discovering new automation opportunities. This automation routine type mining system has particular, but not exclusive, utility for reducing workload in call centers.

BACKGROUND

Agents in a setting such as a contact center must engage in complex sequences of tasks. Data mining or pattern mining can be used to identify repeating patterns in agent behavior, which can then be used to generate automation routines that reduce future workload for the agents. However, because it can be challenging to preprocess, extract, and mine sequences for all use cases, certain routine types may be difficult to discover in this way.

Existing process mining tools (e.g., Celonis, timelinePI, ProcessGold, Minit) attempt to identify potential automations based on system event logs. This may be tackling the problem from an inefficient perspective, however, because data gathered from log events of enterprise application can be a lengthy, resource intensive process, involving customer cooperation. Not all existing apps even have such logs that can be used in this manner. Furthermore, analysis may be on a level of step-in-business-process, without taking into account the actual actions an employee has to take to complete a specific step in a process.

One advantage of process mining tools is that they present the organization with a complete end-to-end flow, identifying potential bottlenecks. Disadvantages, as mentioned above, include the lengthy process to gather data, the lack of complete data and the disconnection between steps in a flow to what can be automated for each step of the flow. The crucial part that customer needs to know in advance which process has issues and may need analysis.

Some process mining vendors added what they call 'Task Mining' capabilities which enriches the process mining data with desktop actions data, but it may only be valuable in the context of a business process which was previously analyzed with event-logs. Also, there are open-source tools for process mining (see ProM—http://www.promtools.org), that also require log events. The different companies with such tools in this area differentiate themselves by the presentation options, ease of data gathering, ease of use and monitoring capabilities.

It is therefore to be appreciated that such commonly used pattern mining techniques have numerous drawbacks, including limitations on the types of routines that can be discovered, and otherwise. Accordingly, long-felt needs exist for new techniques for discovering other routine types and in a more efficient manner.

The information included in this Background section of the specification, including any references cited herein and any description or discussion thereof, is included for technical reference purposes only and is not to be regarded as subject matter by which the scope of the disclosure is to be bound.

SUMMARY

Disclosed is a automation routine type mining system and related methods.

The automation routine type mining system mines usage data from the agents of an enterprise such as a call center or contact center, uses queries to represent the data as a binary vector, and divides the binary vector into relevant sentences. The sentences are then screened for viability (e.g., non-empty, etc.), and are then screened against user-definable constraints, based on a variety of user-definable factors. Sentences that survive the screening are then added to a pool of approved sentences. This pool of sentences can then be mined for sequences that occur frequently (e.g., used by many agents, or used frequently by a single agent, etc.). Frequently occurring sequences can then be turned into new automation routines and rendered as code.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system adapted to automatically create new automation routines. The system includes a processor and a non-transitory computer readable medium operably coupled thereto, the computer readable medium may include a plurality of instructions stored in association therewith that are accessible to, and executable by, the processor, to perform operations which may include: over a period of time, storing a plurality of actions taken by a plurality of agents, where the actions occur within a plurality of applications; from the stored plurality of actions, identifying a repeating pattern of actions, where the actions of the repeating pattern of actions take place in a subset of the plurality of applications; from the stored plurality of actions, constructing a binary vector, each position within the binary vector may include a 1 for an occurrence of any action within any application of the subset of the plurality of applications, and a 0 for a non-occurrence of any action within any application of the subset of the plurality of applications; from the binary vector and the repeating pattern of actions, extracting a sentence, where the sentence may include at least one action within at least one application of the subset of the plurality of applications; based on the repeating pattern of actions, an application type of an application of the subset of the plurality of applications, or a business goal associated with the repeating pattern of actions, creating a constraint; if the sentence meets the constraint, accepting the sentence; if the sentence is accepted; adding the sentence to a pool of accepted sentences; from the pool of accepted sentences, identifying a pattern of occurrences of the accepted sentence; and from the pattern of occurrences of the accepted sentence, creating a new automation routine. Other embodiments of this aspect include corresponding computer systems, apparatus, and computer programs recorded on one or more computer storage devices, each configured to perform the actions of the methods.

Implementations may include one or more of the following features. In some embodiments, the routine is a search routine, a document processing routine, or a focused routine. The pattern of occurrences may include a number of times the sentence has been used, a number of agents using the sentence, or the number of times the application has been used. The constraint may include constraint properties that may include an item constraint, a length constraint, a price constraint, a return on investment constraint, a non-empty sentence constraint, an application usage time constraint, a number of times switching between applications constraint, a number of copy actions constraint, a number of scroll actions constraint, a number of text input actions constraint, or combinations of any of the foregoing. The constraint may include a constraint metric may include an average, a median, a percentage, a minimum, a maximum, a sum, a count, or a duration, where the constraint metric is compared against a configurable threshold. The operations further may include converting the new automation routine into code. The operations further may include making the code available on an automation finder application. Extracting the sentence may involve identifying start points and end points of the sentence based on a maximum number of 1s, a minimum number of 1s, an average number of 1s, or based on a maximum number of 0s, a minimum number of 0s, or an average number of 0s, or based on a look-ahead window of a specified number of actions. Creating the constraint may involve evaluating, for each action within the sentence, the values of constraint properties against constraint metrics, and creating a Boolean expression of the evaluations, where the Boolean expression may include the constraint. Determining whether the sentence meets the constraint may involve matching actions within the sentence to parameters of the constraint. Determining whether the sentence meets the constraint may involve matching actions within the sentence to parameters of the constraint. Implementations of the described techniques may include hardware, a method or process, or computer software on a computer-accessible medium.

One general aspect may include a computer-implemented method adapted to automatically create new automation routines. The computer-implemented method includes, over a period of time, storing a plurality of actions taken by a plurality of agents, where the actions occur within a plurality of applications; from the stored plurality of actions, identifying a repeating pattern of actions, where the actions of the repeating pattern of actions take place in a subset of the plurality of applications; from the stored plurality of actions, constructing a binary vector, each position within the binary vector may include a 1 for an occurrence of any action within any application of the subset of the plurality of applications, and a 0 for a non-occurrence of any action within any application of the subset of the plurality of applications; from the binary vector and the repeating pattern of actions, extracting a sentence, where the sentence may include at least one action within at least one application of the subset of the plurality of applications; based on the repeating pattern of actions, an application type of an application of the subset of the plurality of applications, or a business goal associated with the sequence of actions, creating a constraint; if the sentence meets the constraint, accepting the sentence; if the sentence is accepted; adding the sentence to a pool of accepted sentences; from the pool of accepted sentences, identifying a pattern of occurrences of the accepted sentence; and from the pattern of occurrences of the accepted sentence, creating a new automation routine. Other embodiments of this aspect include corresponding computer systems, apparatus, and computer programs recorded on one or more computer storage devices, each configured to perform the actions of the methods.

Implementations may include one or more of the following features. In some embodiments, the routine is a search routine, a document processing routine, or a focused routine. The pattern of occurrences may include a number of times the sentence has been used, a number of agents using the sentence, or the number of times the application has been used. The constraint may include constraint properties may include an item constraint, a length constraint, a price constraint, a return on investment constraint, a non-empty sentence constraint, an application usage time constraint, a number of times switching between applications constraint, a number of copy actions constraint, a number of scroll actions constraint, a number of text input actions constraint, or combinations of any of the foregoing. The constraint may include a constraint metric that may include an average, a median, a percentage, a minimum, a maximum, a sum, a count, or a duration, where the constraint metric is compared against a configurable threshold. The method may include converting the new automation routine into code. The method may include making the code available on an automation finder application. Extracting the sentence may involve identifying start points and end points of the sentence based on a maximum number of 1s, a minimum number of 1s, an average number of 1s, or based on a maximum number of 0s, a minimum number of 0s, or an average number of 0s, or based on a look-ahead window of a specified number of actions. Creating the constraint may involve evaluating, for each action within the sentence, the values of constraint properties against constraint metrics, and creating a Boolean expression of the evaluations, where the Boolean expression may include the constraint. Implementations of the described techniques may include hardware, a method or process, or computer software on a computer-accessible medium.

The automation routine type mining system disclosed herein has particular, but not exclusive, utility for reducing workload in contact centers.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the automation routine type mining system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
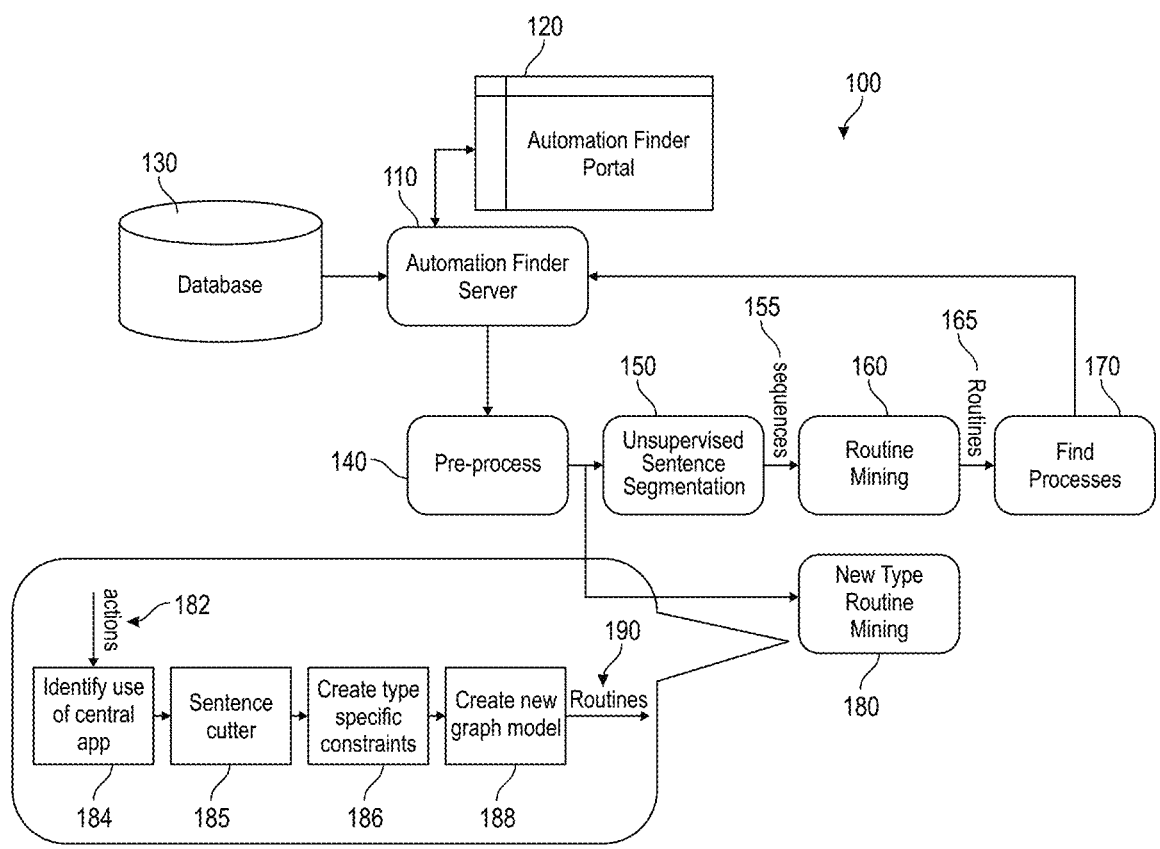
FIG. 1 is a schematic, diagrammatic representation, in block diagram form, of an example automation routine type mining system, in accordance with at least one embodiment of the present disclosure.

In accordance with at least one embodiment of the present disclosure, an automation routine type mining system is provided which can uncover automation opportunities that may be missed by standard pattern mining techniques. Agents in a contact center or other business enterprise engage in complex sequences of tasks. Data mining or pattern mining can be used to identify repeating patterns in agent behavior, which can then be used to generate automation routines that reduce future workload for the agents. However, routine types such as search routines (e.g., typing queries into a search engine), document processing routines (e.g., entering data into a form), and focused routines (e.g., routines that revolve around particular applications) may be difficult to discover in this way. The present disclosure provides a means of identifying usage patterns in the behavior of the agents through analyst engagement, focus on specific applications, and then automatically identifying routine types that are not discovered (or as easily discovered) by generic pattern mining. This may be done, for example, based on user inputs such as a routine-type and an application name to search for, with a tool that also collects data on its own from employee desktop actions. The system can be unsupervised, and can answer the general question of 'what should we automate'? The system performs special segmentation of action based on statistical analysis of application appearances. Applying constraints, vectors, and their combinations enables the system to differentiate between types of special routines.

One example is agents performing a knowledge search in a Knowledge Base. The automation routine type mining system can identify new routines based on a query, formulating the problem as pattern mining under special constraints. Example constraints include: Item constraint—Find web log patterns only about online-bookstores; Length constraint—Find patterns having at least 20 items; Aggregate or price constraint—Find patterns for which the average price of items is over $100.

With a user input of the application name and routine type, the automation routine type mining system can manipulate user data to identify new, previously unidentified routines. The present system can also do so in a more efficient manner using fewer computing and other resources than conventional pattern or data mining.

The automation routine type mining system can map user actions into binary vectors, then cut the binary vectors showing particular application usage into sentences, then screen the sentences according to statistics based on action features (e.g., to remove invalid sentences such as all nulls). The system can also cut sentences based on user input. Next, the system formulates constraints based on the user-specified routine type, along with other considerations such as the application name, application type, desired constraint type, etc. The system then screens the sentences based on the constraints. Those sentences that survive the screening process can then be mined for new automation routines using pattern mining techniques.

To create the binary vector of application usage, the system screens a large volume of agent activity over a period of time (e.g., all agent activity over the course of a day, week, month, etc.). For each time segment for a given agent, the binary vector receives a '1' for an app-related action in one of the searched-for applications, and otherwise receives a '0'. The resulting vector can be readily segmented into sequences by, for example, clipping out empty areas, and can then remove most sequences based for example on a credit counter that decreases or increases credit over the binary vector based on the observed activity. Once the credit is exhausted, there is a switch of agents or a change in shifts, the sentence can be cut to remove extraneous sequences. In this context, the word "sequence" is used generically to refer to a series of agent actions in chronological order, while sentences are specifically the building blocks for mining new routines. Each sentence represents a sequence or a part of a sequence where all actions within it belong to the same context.

In an example for a Knowledge Base application, the user's original actions may be: ['click on . . . ', 'click in KB', 'copy from chrome', 'copy from KB' . . . ]. The resulting binary vector would then be [0,1,0,1,0,0,0,0,0 . . . ], since there was a Knowledge Base action in the second and fourth positions. The vector can then be cut into sentences—[0,1, 0,1], [0000], . . . , and the empty sentences can be screened out, leaving the non-empty sentence [0,1,0,1] . . . .

Types of sentence cutters include, but are not limited to:
Appearance window—based on the app usage credit method described above.
Window ahead—based on minimum (or maximum, or any other statistics) app usage appearance within a window.
No tolerance—cut sentence on even-numbered app usage in a single action.
Types of constraints include, but are not limited to:
App time usage—sum of app action durations within a segment
App switch—number times switching between applications within a segment
Copy—number of copy actions within a segment
Scroll—number of scroll actions within a segment
Text input—number of input text actions within a segment
Constraint on the binary vector—'average' is above percentile p (this ensures p % usage of KB inside the pattern)
Constraint on the duration vector—'span' is above average action duration (this ensures we are viewing a 'search' routine where the user is accessing and reading new text/data)

It is noted that any type of statistics such as minimum, maximum, total count, average, median, etc. can be also applied to the above constraint types. These constraints (and their combination) are used to pick segments that will be used for the mining of special routines types e.g., Search, Document Processing, or Focused routines.

In an example, a search routine might require a minimum usage time for a particular application, along with at least one copy or scroll action. A document processing routine might require a minimum number of application switches, along with a minimum number of input text actions. A focused routine or focused application routine might require a minimum number of actions performed within the focused application(s).

In an example of mining for search routines, a query might cause the system to create a duration vector of actions, which can be multiplied against the binary vector described above. In the example, a non-empty sentence [0,1,0,1] and action duration vector (in seconds, aligned with the sentence) of [6.7, 0.5, 4.2, 3.2] represent an input of 1 sequence: ['click on . . . ', 'click in KB', 'copy from chrome', 'copy from KB'], Sum([0,1,0,1] *[6.7, 0.5, 4.2, 3.2])=3.7. This value could then be measured against a constraint (e.g., minimum value of 3.5) to determine whether the sentence is accepted as a possible candidate for mining new routines.

Constraints may take many forms, including but not limited to an item constraint, a length constraint, a price constraint, a return on investment constraint, a non-empty sentence constraint, an application usage time constraint, a number of times switching between applications constraint, a number of copy actions constraint, a number of scroll actions constraint, a number of text input actions constraint, or combinations of any of these. In some cases, a constraint may be a Boolean expression or set of nested Boolean expressions (e.g., if A and B and (C and not D) then E).

All of the accepted sentences are added to a pool of accepted sentences, which can then be mined according to pattern mining techniques, thus yielding an actionable automation outcome. The identified new possible routines-types are potential automations.

Automations may, for example, be composed of actions, translated from the automation finder tool, as a set of corresponding objects inside an automation studio tool (e.g., objects such as workflow steps, functions and screen elements). These representations can then be transformed into code, e.g., a set of instructions and logic that the automation system then executes at runtime as a dynamic linked library interacting with various applications within the enterprise.

This may also present a value to customers. Large amounts of amounts of money, time, and computing resources are currently spent on manual process discovery, with results that can be subjective and sub-optimal. One figure to use as example is an estimation made by Gartner that the Robotic Process Analysis (RPA) services market is today around $4.5B, with a large portion of that being spent on automation consultancy and discovery services. Selecting the right processes for automation is important for achieving the most benefit from the automation, which increases efficiency of resource use and agent productivity.

Accordingly, the automation routine type mining system of the present disclosure can help efficiently discover potential improvements from at least two key value streams: (1) manual handling of scanned documents (contracts, invoices, personal data like driving license or ID cards) which is time consuming, error prone and can be automated, and (2) search for data in knowledge management databases and other sources (Outlook, Excel, Word, PDFs, custom billing apps, etc.). This may help contact center managers and other enterprises to effectively, quickly, and cheaply identify ever more significant automation opportunities, with a focus on the stressing business needs of search operations and manual processing of scanned documents.

Finding these kinds of routines can be quite challenging with the current classical solution and requires: (1) special segmentation of action based on statistical analysis of application appearances, and (2) applying constraints, vectors, and their combinations to differentiate between types of special routines.

The present disclosure overcomes conventional problems and aids substantially in identifying new automation opportunities and new types of automation opportunity in areas not well explored by traditional pattern mining, by improving the way in which the data is prepared for mining. Implemented on a processor in communication with a database of agent actions, the automation routine type mining system disclosed herein provides practical improvements in automation, with associated savings of time, money, resources, and effort. This augmented automation capability transforms a manual, expert-driven process of identifying and creating automations into a precise, repeatable means of identifying targets and implementing new automations, without the normally routine need to hire an expert. This unconventional approach improves the functioning of the contact center computer systems, by reducing the time and effort required for agents to perform common tasks and increasing their productivity.

The automation routine type mining system may be implemented as a process at least partially viewable on a display, and operated by a control process executing on a processor that accepts user inputs from a keyboard, mouse, or touchscreen interface, and that is in communication with one or more operators generating queries. In that regard, the control process performs certain specific operations in response to different inputs or selections made at different times. Outputs of the automation routine type mining system may be printed, shown on a display (as shown for example in FIGS. 3A-3B and 14-16, below), or otherwise communicated to human operators. Certain structures, functions, and operations of the processor, display, sensors, and user input systems are known in the art, while others are recited herein to enable features or aspects of the present disclosure with particularity.

These descriptions are provided for exemplary purposes only, and should not be considered to limit the scope of the automation routine type mining system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic, diagrammatic representation, in block diagram form, of an example automation routine type mining system 100, in accordance with at least one embodiment of the present disclosure. In the example shown in FIG. 1, an automation finder portal 120 operates on an automation finder server 110 in communication with a database 130 of agent actions (e.g., all agent actions over the course of a day, week, month, etc.).

The automation finder server 110 initiates a pre-processing step 140 to prepare the agent action data for analysis. Next, an unsupervised sentence segmentation routine 150 divides the data into sequences 155, and a routine mining module generates routines from the sequences. A "find processes" step identifies useful automation routines from the routines 165, and communicates them back to the automation finder server 110.

However, for difficult-to-mine automation routines and routine types, a new type routine mining module 180 is used, wherein the actions 182 from the database 130 are fed into a query module 184 that identifies the application or applications for which new automations are sought, and generates an appropriate binary vector as described above. This vector is passed to the sentence cutter 185, and the cut sentences are then passed to a constraint routine 186 that creates type-specific constraints that are useful for distinguishing sentences that may or may not contain useful automation targets. Sentences that meet the constraints are added to a pool of approved sentences and passed to a model generator 188, that analyzes the pool of approved sentences to identify commonly occurring sequences. For example, if sentences such as ABCDEFG, ABDFG, and ABCDD occur frequently, then ABD might be identified as a repeating pattern across a large plurality of sentences, and therefore a strong target for automation. The model generator 188 then produces routines 190, which are again sent back to the process finder 170 and thence to the automation finder server 110.

Block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Before continuing, it should be noted that the examples described above are provided for purposes of illustration, and are not intended to be limiting. Other devices and/or device configurations may be utilized to carry out the operations described herein.

Figure 2:
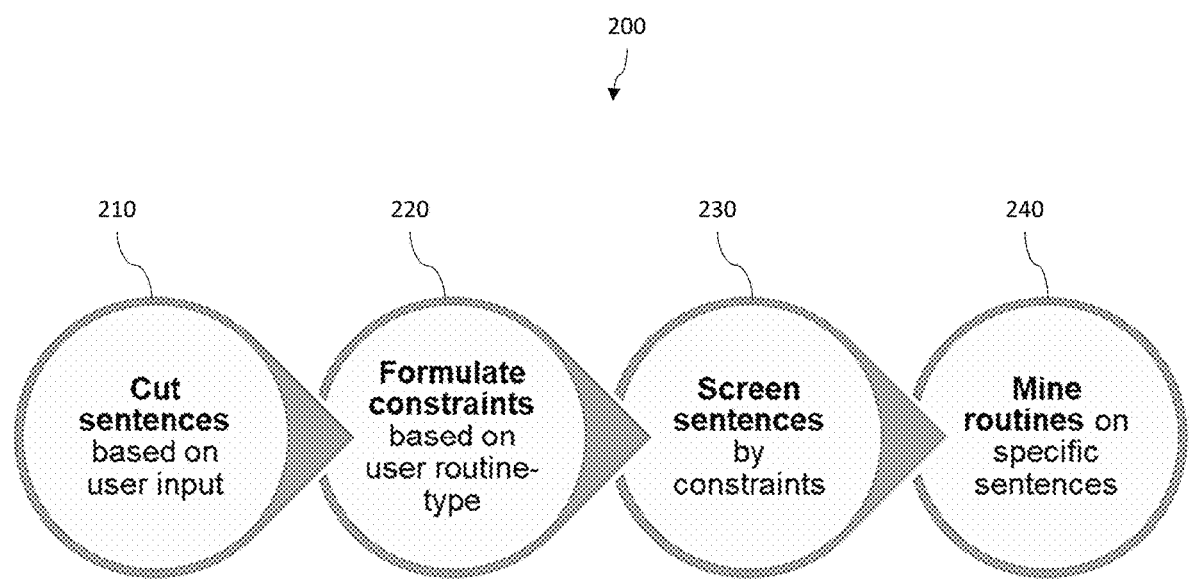
FIG. 2 is a schematic, diagrammatic representation, in flow diagram form, of an example new routine type mining method, in accordance with at least one embodiment of the present disclosure.

FIG. 2 is a schematic, diagrammatic representation, in flow diagram form, of an example new routine type mining method 200, in accordance with at least one embodiment of the present disclosure. It is understood that the steps of method 200 may be performed in a different order than shown in FIG. 2, additional steps can be provided before, during, and after the steps, and/or some of the steps described can be replaced or eliminated in other embodiments. One or more of steps of the method 200 can be carried by one or more devices and/or systems described herein, such as components of the automation routine type mining system 100, and/or processor circuit 1750.

In step 210, the method 200 includes generating a binary vector based on a user query, and cutting the binary vector into sentences using user-editable criteria. Execution then proceeds to step 220.

In step 220, the method 200 includes formulating constraints based on the routine type the user is searching for. Various user-editable constraint types may be selected by the user (e.g., from a menu). Execution then proceeds to step 230.

In step 230, the method 200 includes screening the sentences by the constraints, to yield a pool of approved sentences that are candidates for pattern mining. Execution then proceeds to step 240.

In step 240, the method 200 includes using pattern mining techniques to identify new routines from patterns of repeated activity found in the pool of approved sentences. The method 200 is now complete.

Flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, producing binary vectors from a large database of agent actions, cutting sentences from the binary vector, screening the sentences based on the constraints, and mining the screened sentences for routines, may each include thousands or millions of individual operations. In order to perform these tasks while a human operator is querying the database, the method must execute these instructions in a period of minutes or preferably only seconds.

Figure 3A:
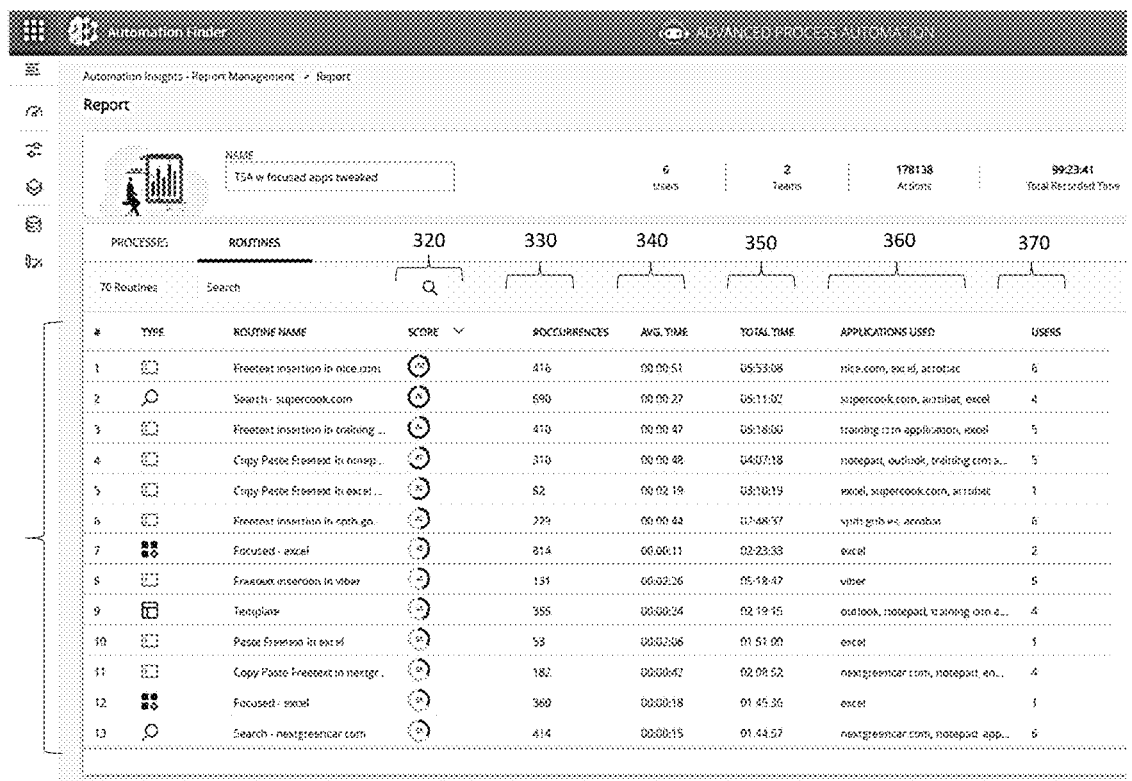
FIG. 3A is an example automation finder screen display of an automation routine type mining system, in accordance with at least one embodiment of the present disclosure.

FIG. 3A is an example automation finder screen display 300 of an automation routine type mining system, in accordance with at least one embodiment of the present disclosure. The screen display 300 shows a number of automation routines 310, each with an associated score 320 (e.g., a number between 0 and 100 indicating how desirable this routine would be for implementation in the enterprise), a number of occurrences 330, average time spent on the actions per occurrence 340, and total time spent on the actions 350 (with more frequent occurrence and longer times indicating a greater opportunity for savings). Also indicated are the applications used by the automation routine 360, and the number of users of the automation routine. One useful analysis that can be performed via this screen display 300 is identifying high-scoring automations with few users. Such routines may be good targets for an information campaign within the enterprise.

Figure 3B:
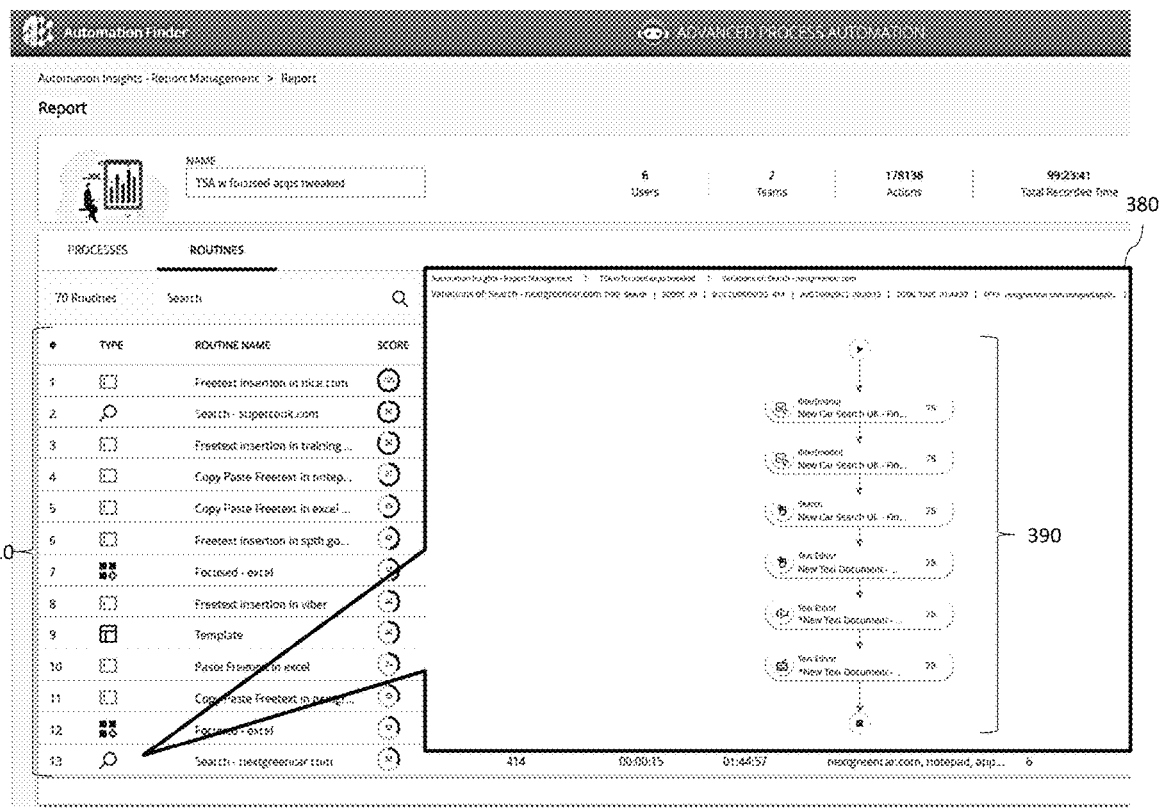
FIG. 3B is an example automation finder screen display of an automation routine type mining system, in accordance with at least one embodiment of the present disclosure.

FIG. 3B is an example automation finder screen display 300 of an automation routine type mining system, in accordance with at least one embodiment of the present disclosure. The screen display 300 shows a particular automation routine 380 that has been selected and magnified, showing the specific actions 390 taken by the routine (e.g., performing filter and search operations on a website called New Car Search UK, and creating new text documents in a text editor).

Figure 4:
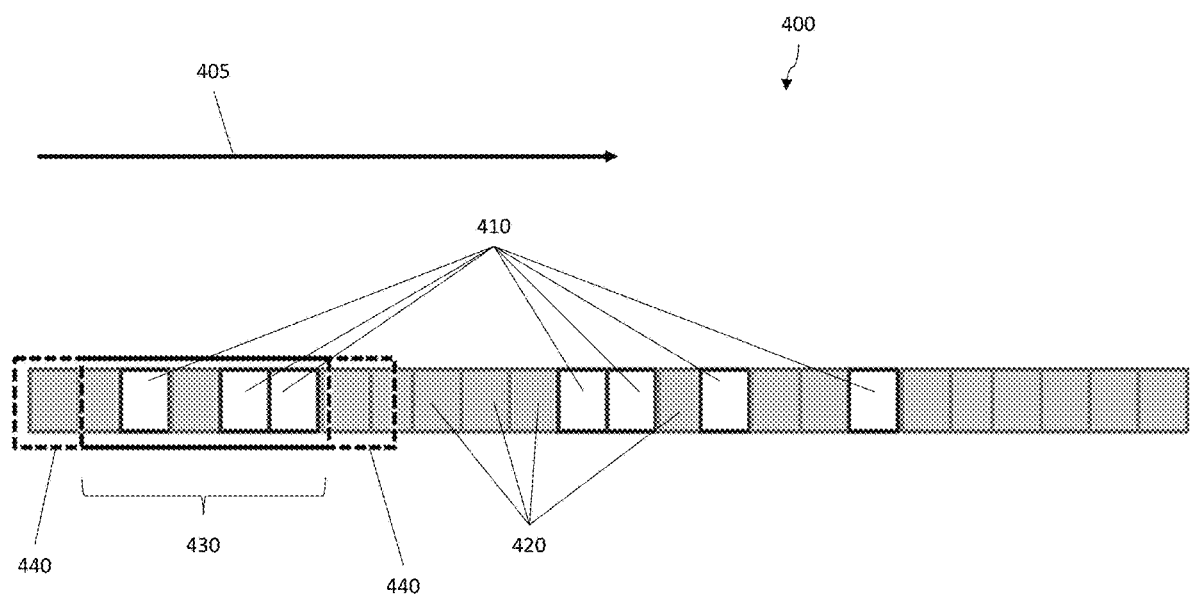
FIG. 4 is an example binary vector, in accordance with at least one embodiment of the present disclosure.

FIG. 4 is an example binary vector 400, in accordance with at least one embodiment of the present disclosure. Each square in the binary vector indicates an action taken by an agent, with the left-right axis 405 indicates the order in which the actions were taken. Light squares 410 indicate a "1" in the binary vector (e.g., indicate that this particular action involved one of the queried target applications), whereas dark squares 420 indicate a "0" in the binary vector (e.g., indicate that this particular action did not involve one of the queried target applications). A sentence cutter may identify a sentence 430 in the binary vector, surrounded by null ends 440.

Figure 5:
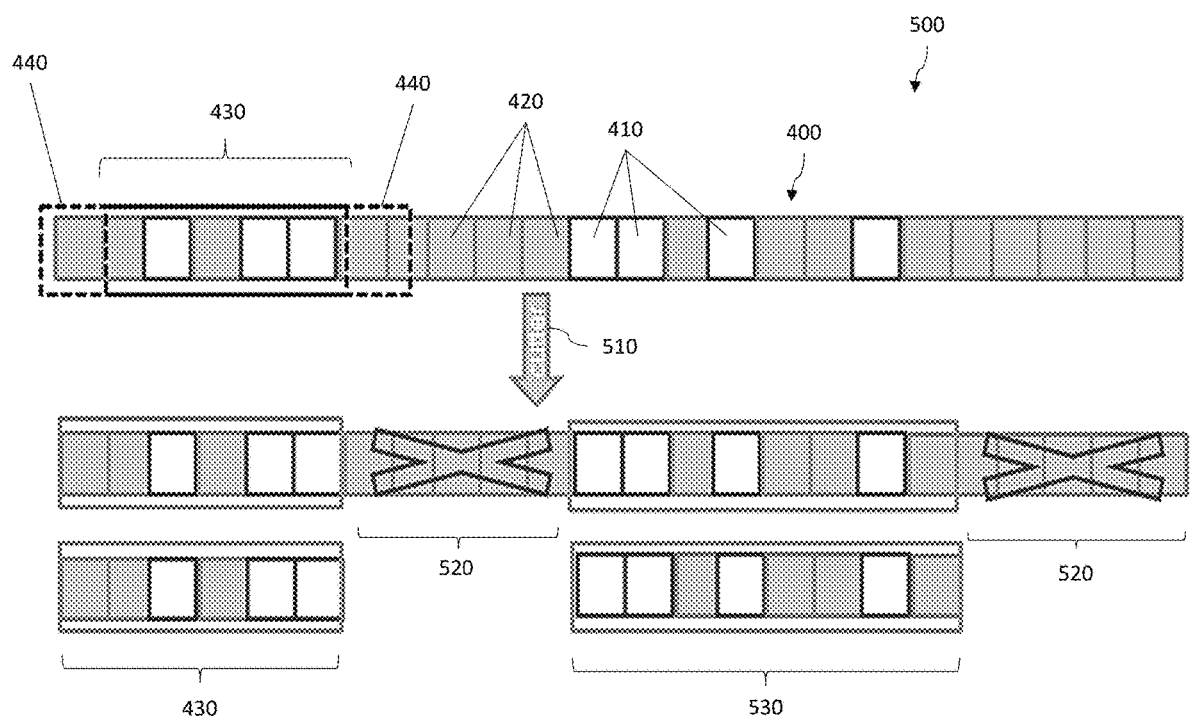
FIG. 5 is a graphical representation of a sentence cutting process, in accordance with at least one embodiment of the present disclosure.

FIG. 5 is a graphical representation of a sentence cutting process 500, in accordance with at least one embodiment of the present disclosure. Visible is the binary vector 400 from FIG. 4, including the white squares 410, dark squares 420, sentence 430, and null ends 440. The sentence cutter 510 removes null segments 520, leaving behind the sentence 430 and a second sentence 530. These sentences can now be screened against type-specific constraints and then (if they pass the constraint) added to the pool of accepted sentences to be mined for new routines.

Figure 6:
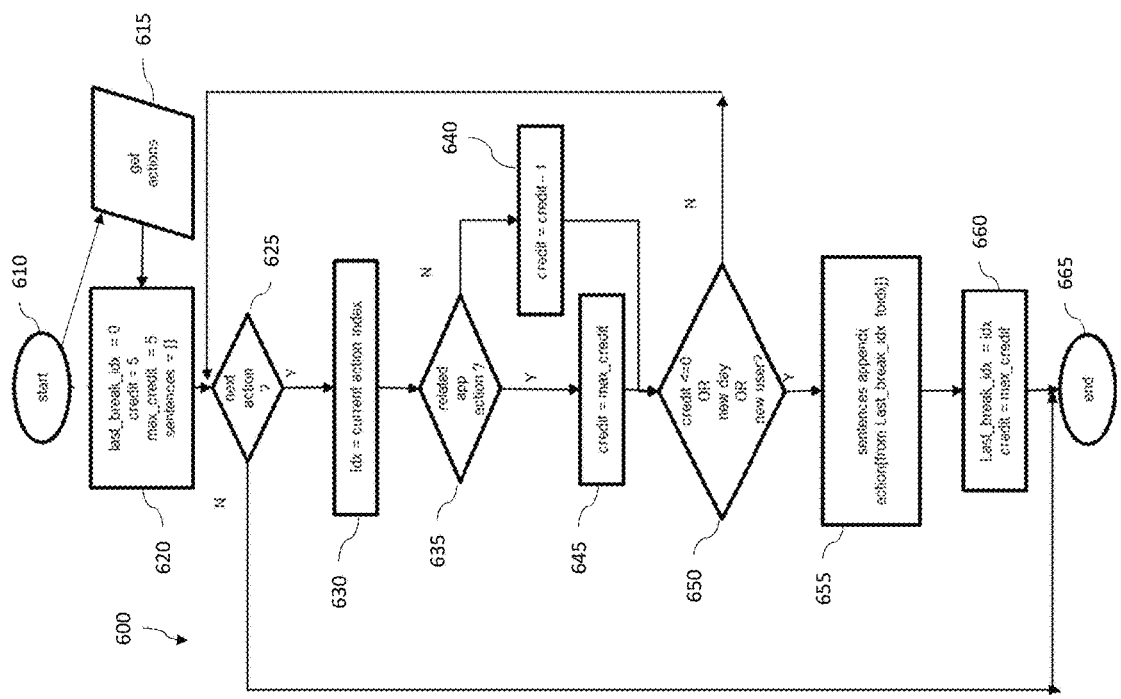
FIG. 6 is a is a schematic, diagrammatic representation, in flow diagram form, of an example appearance window—based sentence method, in accordance with at least one embodiment of the present disclosure.

FIG. 6 is a schematic, diagrammatic representation, in flow diagram form, of an example appearance window—based sentence cutting method 600, in accordance with at least one embodiment of the present disclosure. The method 600 makes use of the app usage credit system discussed above.

In step 610, the method 600 begins. Execution then proceeds to step 615.

In step 615, the method 600 includes fetching the database of agent actions over a period of time (e.g., all agent actions over the course of a day, a week, a month, etc.). Execution then proceeds to step 620.

In step 620, the method 600 includes initializing variables and setting the credit value to 5. Execution then proceeds to step 625.

In step 625, the method 600 includes checking to see if there is a next action. If yes, execution then proceeds to step 630. If no, execution then proceeds to step 665.

In step 630, the method 600 includes saving the current action index. Execution then proceeds to step 635.

In step 635, the method 600 includes checking to see whether the current action is related to one of the queried target applications. If yes, execution then proceeds to step 645. If no, execution then proceeds to step 640.

In step 640, the method 600 includes decrementing the credits by one. Execution then proceeds to step 645.

In step 645, the method 600 includes resetting the credits back to 5. Execution then proceeds to step 650.

In step 650, the method 600 includes checking to see whether the credits are less than or equal to zero, or if this action represents a new agent, or if this action represents the end of a shift or the start of a new shift. If any of the above are true, execution then proceeds to step 655. If all of the above are false, execution then returns to step 625.

In step 655, the method 600 includes storing the sentence. Execution then proceeds to step 660.

In step 660, the method 600 includes cutting the sentence. Execution then proceeds to step 665.

In step 665, the method 600 is complete.

The following is pseudocode showing how such a method could be implemented:

```
last_break_idx=0
app_credit=5
max_app_credit=5
sentences=[ ]
for idx, used_app in enumerate(app_usage):
    if used_app:
        app_credit=max_app_credit
    else:
        app_credit-=1
    switch=switched_user(last_break_idx, idx) or
        switched_day(last_break_idx, idx)
    if app_credit<=0 or switch:
        sentence=cut_sentence(last_break_idx, idx)
        sentences.append(sentence)
        last_break_idx=idx
        app_credit=max_app_credit
```

Figure 7:
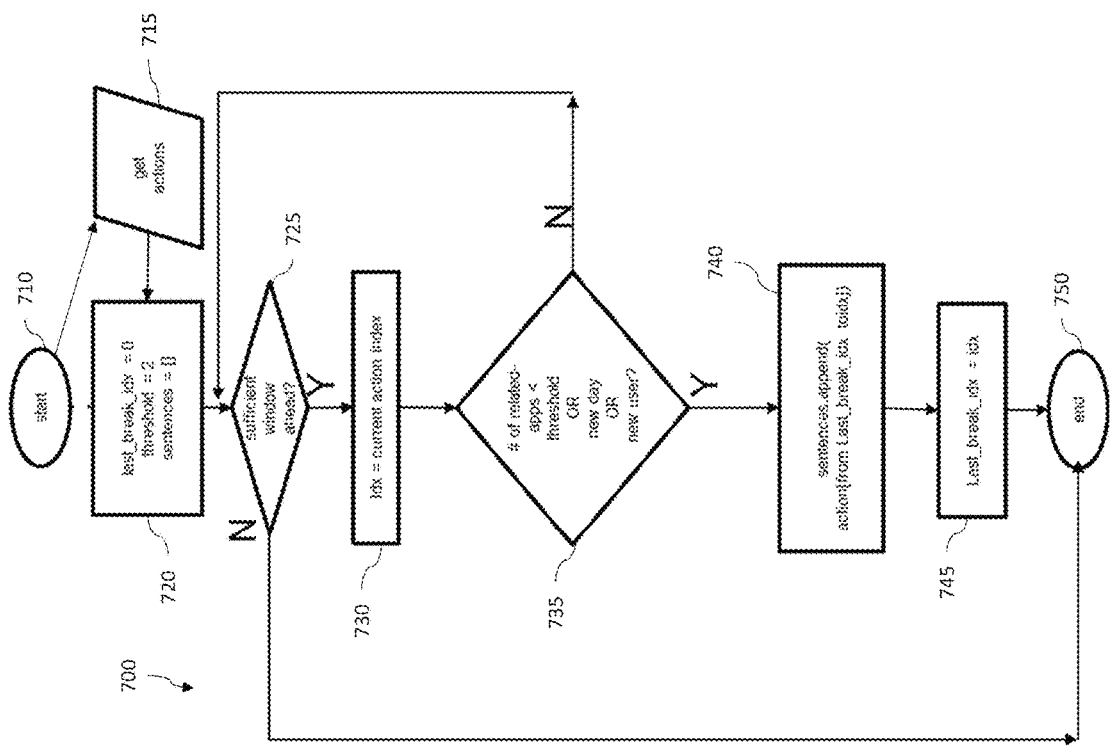
FIG. 7 is a is a schematic, diagrammatic representation, in flow diagram form, of an example window ahead—based sentence cutting method, in accordance with at least one embodiment of the present disclosure.

FIG. 7 is a schematic, diagrammatic representation, in flow diagram form, of an example window ahead—based sentence cutting method 700, in accordance with at least one embodiment of the present disclosure. In the example shown in FIG. 7, the termination of a sentence is based on minimum (any other statistics) app usage appearance within a window, although it could be based on maximum, average, moving average, or any other desired statistic.

In step 710, the method 700 begins. Execution then proceeds to step 715.

In step 715, the method 700 includes fetching the database of agent actions. Execution then proceeds to step 720.

In step 720, the method 700 includes initializing variables. Execution then proceeds to step 725.

In step 725, the method 700 includes determining whether there is sufficient window ahead (e.g., whether the end of the database is more than zero actions away). If no, execution then proceeds to step 750. If yes, execution then proceeds to step 730.

In step 730, the method 700 includes incrementing the current action index and examining a new current action from the database. Execution then proceeds to step 735.

In step 735, the method 700 includes determining whether the number of searched-for target apps found in the sentence is less than a user-settable threshold value, OR if the current action represents the start of a new shift or workday, OR if the current action represents the first action of a new agent. If any of the above are true, execution then proceeds to step 740. If none of the above are true, execution then returns to step 725.

In step 740, the method 700 includes storing the sentence. Execution then proceeds to step 745.

In step 745, the method 700 includes cutting the sentence. Execution then proceeds to step 750.

In step 750, the method 700 is complete.

The following is pseudocode showing how such a method could be implemented:
```
threshold=2
window_size=10
last_break_idx=0
for idx, used_app in enumerate(self.app_usage):
    if idx==0 or idx+window_size>=len(self.app_usage):
        #no window to look at
        continue
    window_ahead=self.app_usage[idx: idx+window_size]
    switch=self.switched_user(last_break_idx, idx) or self.switched_day(last_break_idx, idx)
    if sum(window_ahead)<threshold or switch:
        self.cut_sentence(last_break_idx, idx)
        last_break_idx=idx
#cut last sentence
idx=len(self.actions)
self.cut_sentence(last_break_idx, idx)
```

Figure 8:
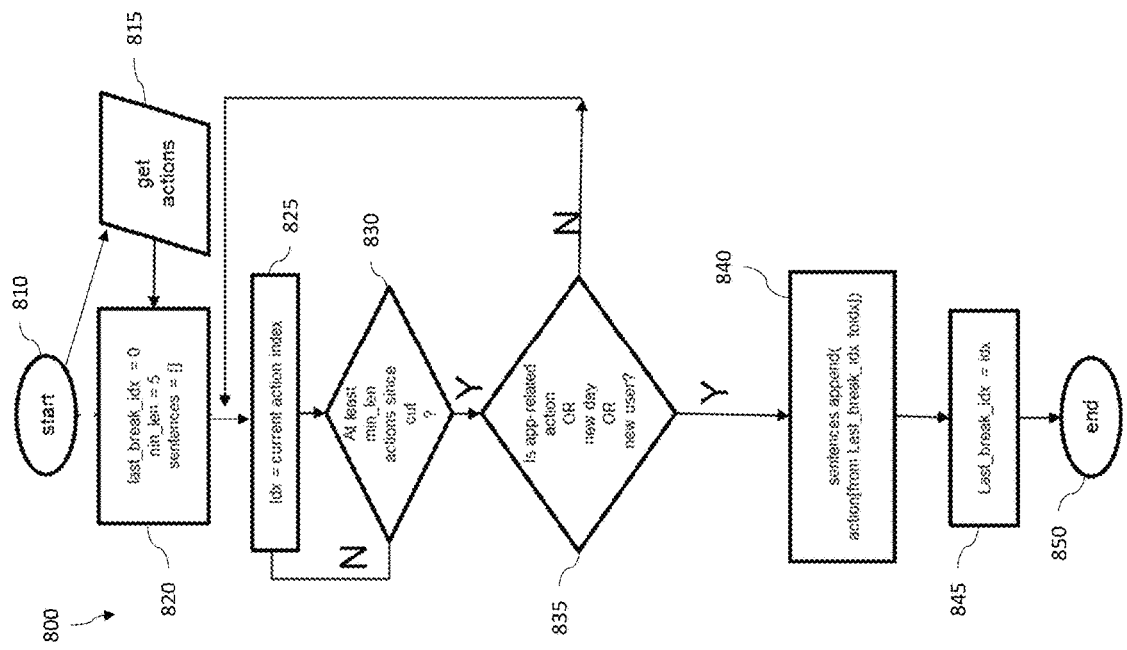
FIG. 8 is a is a schematic, diagrammatic representation, in flow diagram form, of an example no tolerance sentence cutting method, in accordance with at least one embodiment of the present disclosure.

FIG. 8 is a schematic, diagrammatic representation, in flow diagram form, of an example no tolerance sentence cutting method 800, in accordance with at least one embodiment of the present disclosure. In the example shown in FIG. 8, the method will cut the sentence on even-numbered app usage in a single action.

In step 810, the method 800 begins. Execution then proceeds to step 815.

In step 815, the method 800 includes fetching the database of agent actions. Execution then proceeds to step 820.

In step 820, the method 800 includes initializing variables. Execution then proceeds to step 825.

In step 825, the method 800 includes incrementing the current action index and examining a new current action from the database. Execution then proceeds to step 830.

In step 830, the method 800 includes determining whether the number of actions since the last cut exceeds a threshold minimum value.

In step 835, the method 800 includes determining whether the number of searched-for target apps found in the sentence is less than a user-settable threshold value, OR if the current action represents the start of a new shift or workday, OR if the current action represents the first action of a new agent. If any of the above are true, execution then proceeds to step 840. If none of the above are true, execution then returns to step 825.

In step 840, the method 800 includes storing the sentence. Execution then proceeds to step 845.

In step 845, the method 800 includes cutting the sentence. Execution then proceeds to step 850.

In step 850, the method 800 is complete.

The following is pseudocode showing how such a method could be implemented:
```
min_len=5
last_break_pt=0
for idx, used_app in enumerate(self.app_usage):
    if idx—last_break_pt<min_len:
        continue
    switch=self.switched_user(last_break_pt, idx) or self.switched_day(last_break_pt, idx)
    if not used_app or switch:
        self.cut_sentence(last_break_pt, idx)
        last_break_pt=idx
#cut last sentence
idx=len(self.actions)
self.cut_sentence(last_break_pt, idx)
```

Figure 9:
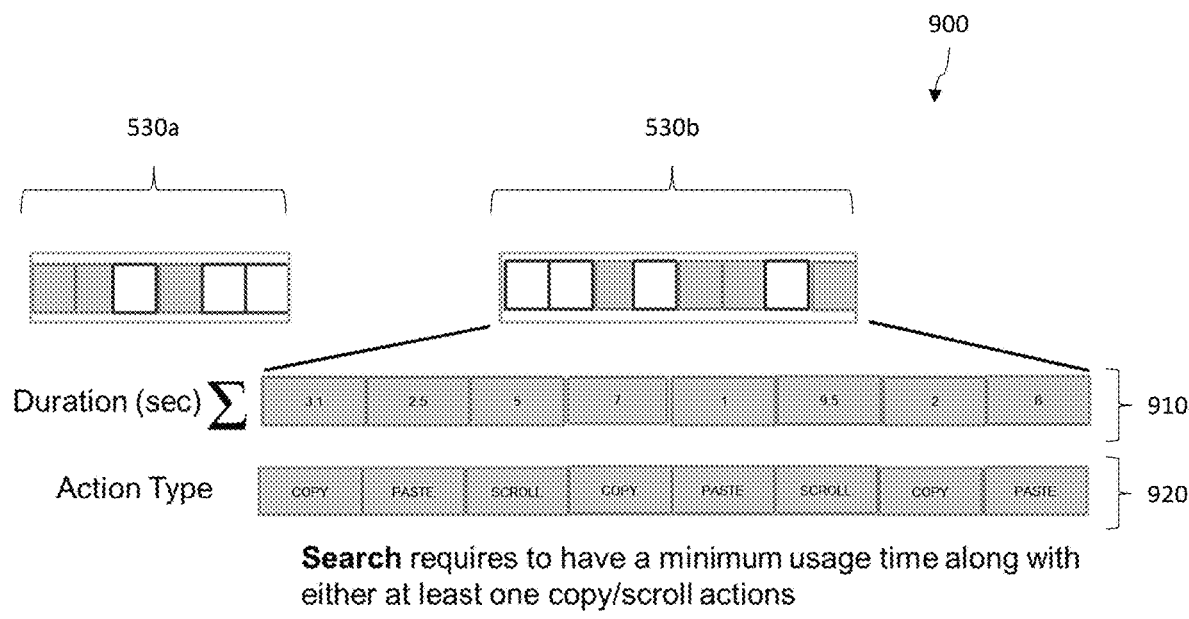
FIG. 9 is a schematic, diagrammatic representation of at least a portion of a duration-based sentence cutting method, in accordance with at least one embodiment of the present disclosure.

FIG. 9 is a schematic, diagrammatic representation of at least a portion of a duration-based sentence cutting method 900, in accordance with at least one embodiment of the present disclosure. Visible are a first sentence 530a and a second sentence 530b. The second sentence contains a list of actions 920 taken by the agent, and a corresponding list of durations 910 for the actions 920. These durations 910 may be used to cut the sentence, or may be features used in constraints or in pattern mining.

The overall solution is achieved by formulating the problem as a segmentation and mining under special constraints. For the sake of explanation, examples of constraints for a general problem of events occurring sequentially may be:
  Item constraint—Find web log patterns only about online-bookstores
  Length constraint—Find patterns having at least 20 items
  Aggregate constraint—Find patterns that the average price of items is over $100

For every type of routine we wish to output, constraints may be designed to convey the business logic that describe the routine-type and the routine pattern should adhere to. Given the segmented sentences, for every routine type, its constraints will be applied, filtering only sentences that adhere to the constraints. Constraint vectors and their combinations allow the system to differentiate between types of special routines.

Other types of constrains may include, but are not limited to:
  App time usage—sum of app actions durations within a sentence
  App switch—number of app switches actions within a sentence
  Copy—number of copy actions within a sentence
  Scroll—number of scroll actions within a sentence
  Text input—number of input text actions within a sentence Any type of statistics such as average, median, min, max, etc. can also be applied instead or in addition to a sum or number count as used in the above 5 types. The 'App time usage' constraint can be a constraint on the duration vector 910.

These constraints (and their combination) are used to pick segmented sentences that will be used for the mining of special routine types, e.g., search. The minimum number counts and minimum duration sum used are set to tuned values but may be changed. In an example:
  Search requires a minimum usage time along with either at least one copy/scroll actions Document Processing requires a minimum of application switches along with minimum input text actions Focused Application routine requires a minimum number of actions within the chosen focused application The constraints filter can be generated by creating 2 vectors per sentence. The first, the application appearance binary vector is as described above. The second vector, where every item in vector also refers to an action in the sentence in the order it appears, describes the constraint feature. For example:

App time usage—e.g. [6.7, 0.5, 4.2, 3.2] shows the duration of each action in seconds App switch—e.g. [1,1,1,1] Booleans showing whether the current action takes place in a different application than the previous action Copy—e.g. [0,0,1,1] Booleans showing which actions are copy actions Scroll—e.g. [0,0,0,0] Booleans showing which actions are scroll actions Text input—e.g. [0,0,1,1] Booleans showing which actions are text actions Example for 'Search' sum usage constraint applied on one sentence:

Input of a sentence:

['click on . . . ', 'click in KB', 'copy from chrome', 'copy from KB']

Application appearance vector for the Knowledge Base app—[0,1,0,1]

Action duration vectors (aligned with sentences)—[6.7, 0.5, 4.2, 3.2]

Sum([0,1,0,1] *[6.7, 0.5, 4.2, 3.2])=3.7

For each routine type and user-chosen application, constraints creation and sentence filtering (and the subsequent steps) may be done separately.

Figure 10:
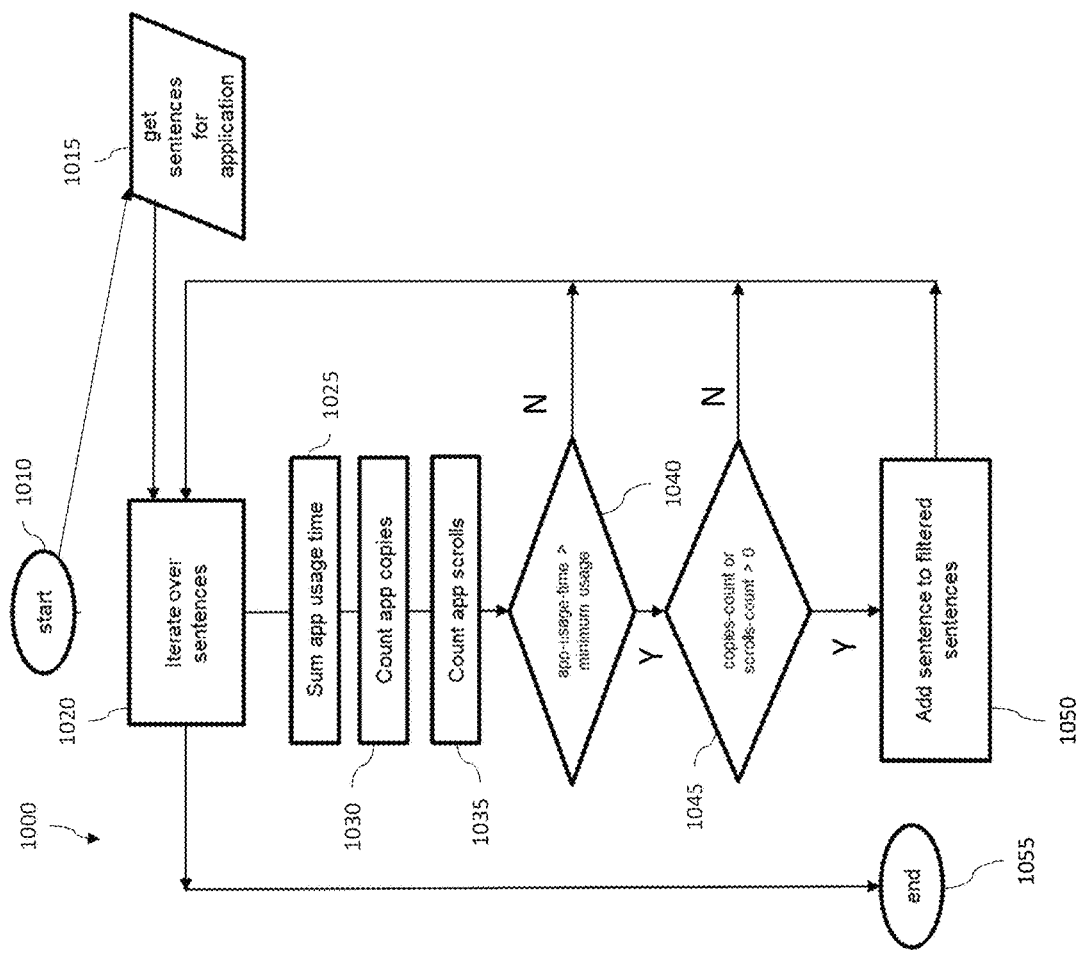
FIG. 10 is a schematic, diagrammatic representation, in flow diagram form, of an example search routine constraint filtering method for one or more user-selected applications, in accordance with at least one embodiment of the present disclosure.

FIG. 10 is a schematic, diagrammatic representation, in flow diagram form, of an example search routine constraint filtering method 1000 for one or more user-selected applications, in accordance with at least one embodiment of the present disclosure. This method eliminates sentences that do not appear to be search-related.

In step 1010, the method 1000 begins. Execution then proceeds to step 1015.

In step 1015, the method 1000 includes fetching a pool of sentences that contain actions within the selected application(s). Execution then proceeds to step 1020.

In step 1020, the method 1000 includes iterating over the sentences. Execution then proceeds to step 1025.

In step 1025, the method 1000 includes, within the current sentence, summing the total time spent using the selected app(s).

In step 1030, the method 1000 includes, within the current sentence, counting the number of copy actions within the selected app(s). Execution then proceeds to step 1035.

In step 1035, the method 1000 includes, within the current sentence, counting the number of scroll operations within the selected app(s). Execution then proceeds to step 1040.

In step 1040, the method 1000 includes determining whether the app usage time exceeds a user-definable threshold. If no, then the current sentence fails the constraint, and execution then returns to step 1020. If yes, then execution proceeds to step 1045.

In step 1045, the method 1000 includes determining whether the number of copies and/or the number of scrolls is greater than zero. If no, then the sentence fails the constraint, and execution returns to step 1020. If yes, then the sentence meets the constraint, and execution then proceeds to step 1050.

In step 1050, the method 1000 includes adding the current sentence to the pool of accepted sentences (e.g., sentences that have passed the constraint). Execution then returns to step 1020.

In step 1055, the method 1000 includes completing the iteration over the available sentences. Execution is now complete.

The following is pseudocode showing how such a method could be implemented:

```
usage_time=10 #in secs
search_sentences=[ ]
for idx, sentence in enumerate(sentences):
    app_time_usage=sum([app*time for app, time in zip
        (app_sentence[idx], time_sentence [idx])])
    app_copy=sum([app*copy for app, copy in zip
        (app_sentence[idx], copy_sentence[idx])])
    app_scroll=sum([app*scroll for app, scroll in zip
        (app_sentence[idx], scroll_sentence [idx])])
    if app_time_usage>usage_time and (app_copy or app_
        scroll):
        search_sentences.append(sentence)
```

Figure 11:
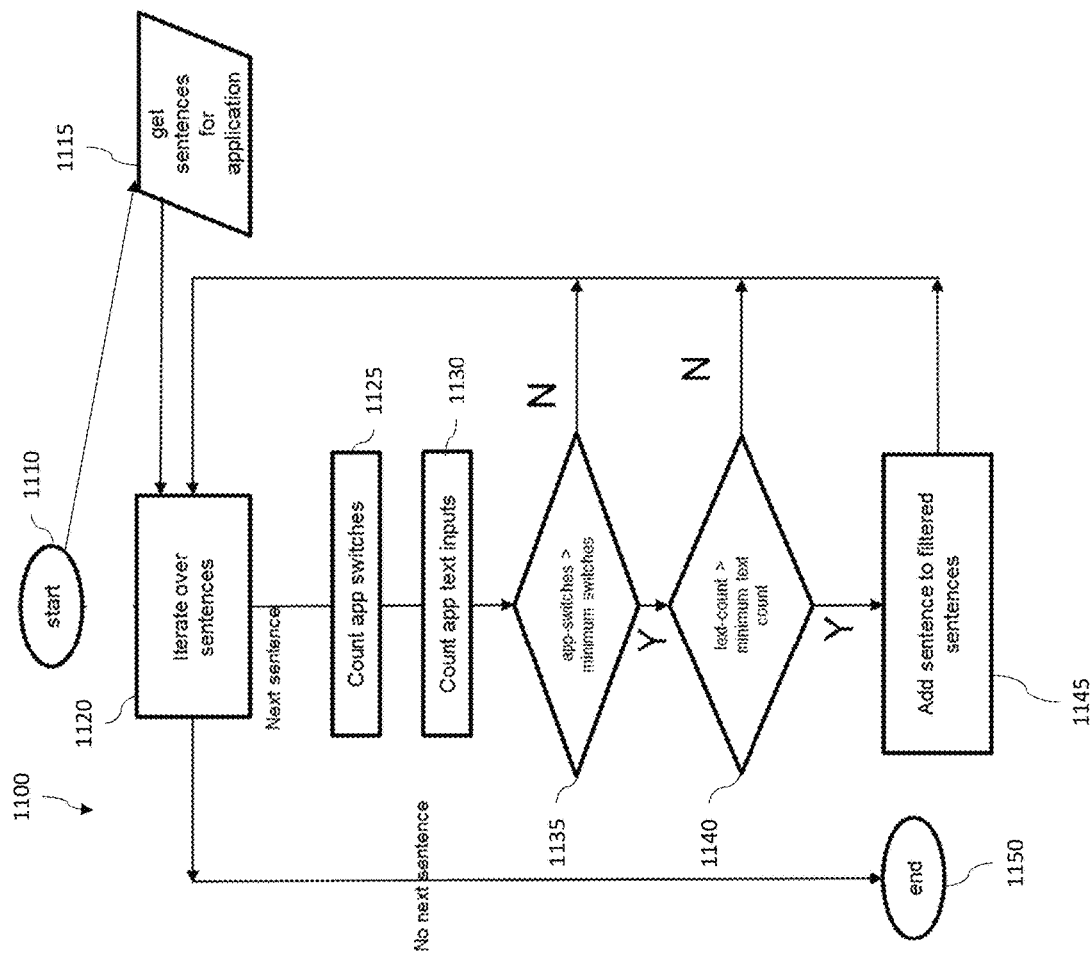
FIG. 11 is a is a schematic, diagrammatic representation, in flow diagram form, of an example document processing routine constraint filtering method for at least one user-selected application, in accordance with at least one embodiment of the present disclosure.

FIG. 11 is a schematic, diagrammatic representation, in flow diagram form, of an example document processing routine constraint filtering method 1100 for at least one user-selected application, in accordance with at least one embodiment of the present disclosure. This method screens out sentences that do not appear to be related to document processing.

In step 1110, the method 1100 begins. Execution then proceeds to step 1115.

In step 1115, the method 1100 includes fetching a pool of sentences that contain actions within the selected application(s). Execution then proceeds to step 1120.

In step 1120, the method 1100 includes iterating over the sentences. Execution then proceeds to step 1125.

In step 1125, the method 1100 includes, within the current sentence, counting the number of times the agent switches between applications. Execution then proceeds to step 1130.

In step 1130, the method 1100 includes, within the current sentence, counting the number of times the agent enters text. Execution then proceeds to step 1135.

In step 1135, the method 1100 includes determining whether the number of application switches exceeds a user-definable threshold. If no, then the current sentence fails the constraint, and execution then returns to step 1120. If yes, then execution proceeds to step 1140.

In step 1140, the method 1100 includes determining whether the number of text entry actions exceeds a user-definable threshold. If no, then the current sentence fails the constraint, and execution then returns to step 1120. If yes, then execution proceeds to step 1145.

In step 1145, the method 1100 includes adding the current sentence to the pool of accepted sentences (e.g., sentences that have passed the constraint). Execution then returns to step 1120.

In step 1150, the method 1100 includes completing the iteration over the available sentences. Execution is now complete.

The following is pseudocode showing how such a method could be implemented:

```
min_switches=2
min_text_inputs=2
doc_proc_sentences=[ ]
for idx, sentence in enumerate(sentences):
    app_switches=sum([app*switch for app, switch in zip
        (app_sentence[idx], switch_sentencel[idx])])
``` text_input=sum([(not app)*text for app, text in zip
(app_sentence[idx], text_sentencel[idx])])
  if app_switches>min_switches and text_input>min_text_inputs:
    doc_proc_sentences.append(sentence)

Figure 12:
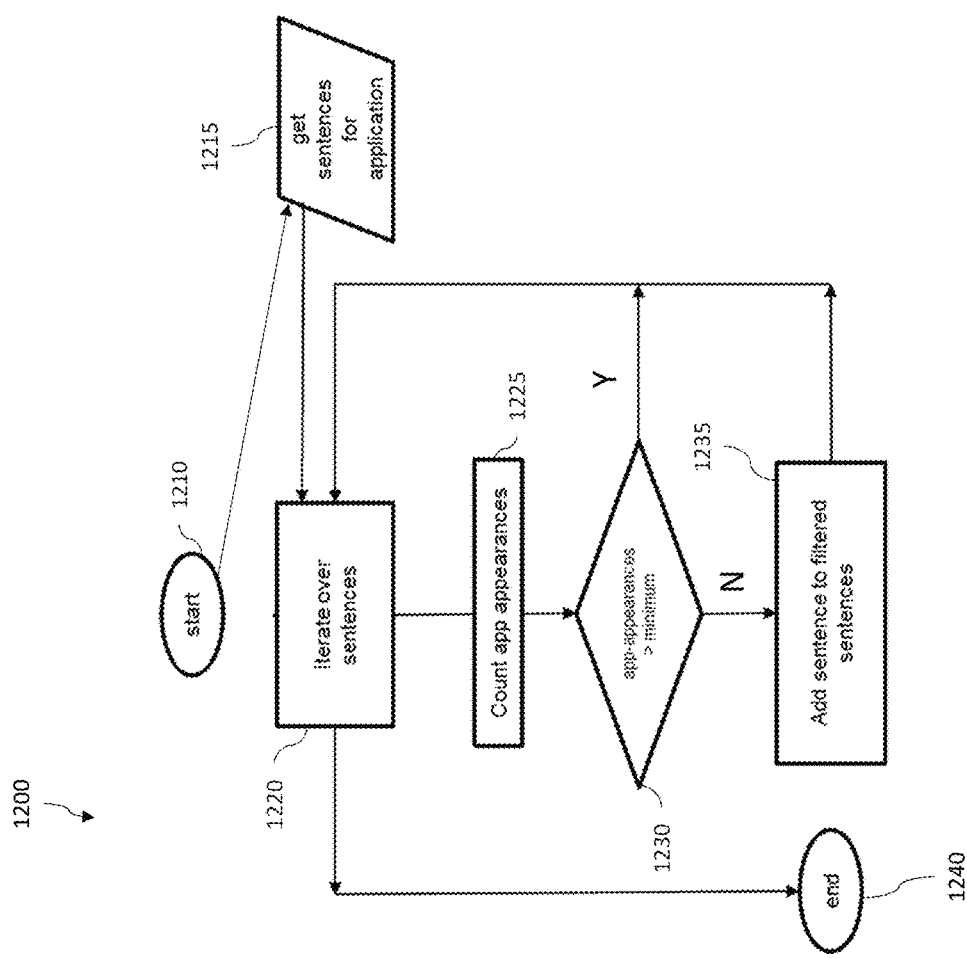
FIG. 12 is a is a schematic, diagrammatic representation, in flow diagram form, of an example focused application routine constraint filtering method for at least one user-selected application, in accordance with at least one embodiment of the present disclosure.

FIG. 12 is a schematic, diagrammatic representation, in flow diagram form, of an example focused application routine constraint filtering method 1200 for at least one user-selected application, in accordance with at least one embodiment of the present disclosure. This method screens out sentences that do not hold a minimum number of actions related to a single application (or other specified number of applications) and are thus not focused on the application(s).

In step 1210, the method 1200 begins. Execution then proceeds to step 1215.

In step 1215, the method 1200 includes fetching a pool of sentences that contain actions within the selected application(s). Execution then proceeds to step 1220.

In step 1220, the method 1200 includes iterating over the sentences. Execution then proceeds to step 1225.

In step 1225, the method 1200 includes, within the current sentence, determining whether the total number of applications that appear is greater than a user-definable threshold value. If yes, then the current sentence fails the constraint, and execution then returns to step 1220. If yes, then execution proceeds to step 1235.

In step 1235, the method 1200 includes adding the current sentence to the pool of accepted sentences (e.g., sentences that have passed the constraint). Execution then returns to step 1220.

In step 1240, the method 1200 includes completing the iteration over the available sentences. Execution is now complete.

Figure 14:
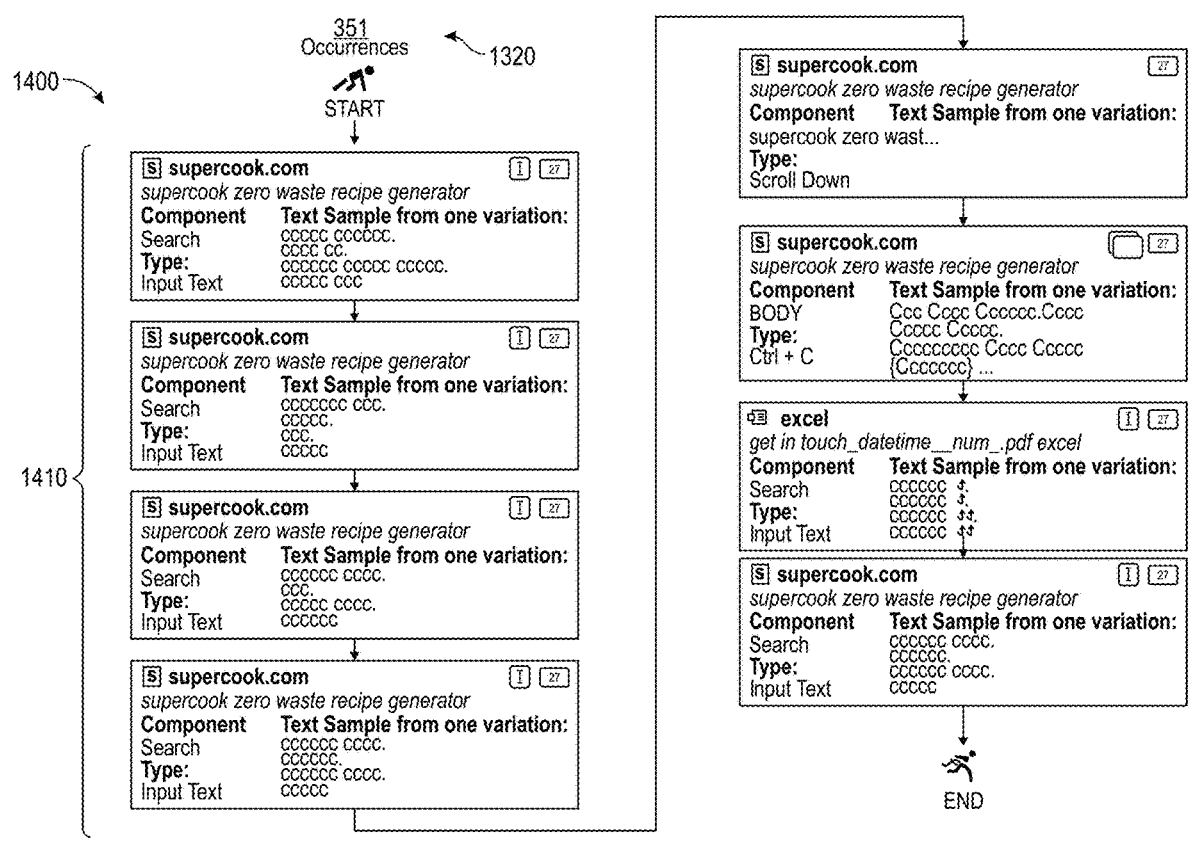
FIG. 14 is an example screen display of a sentence containing actions, in accordance with at least one embodiment of the present disclosure.
Figure 15:
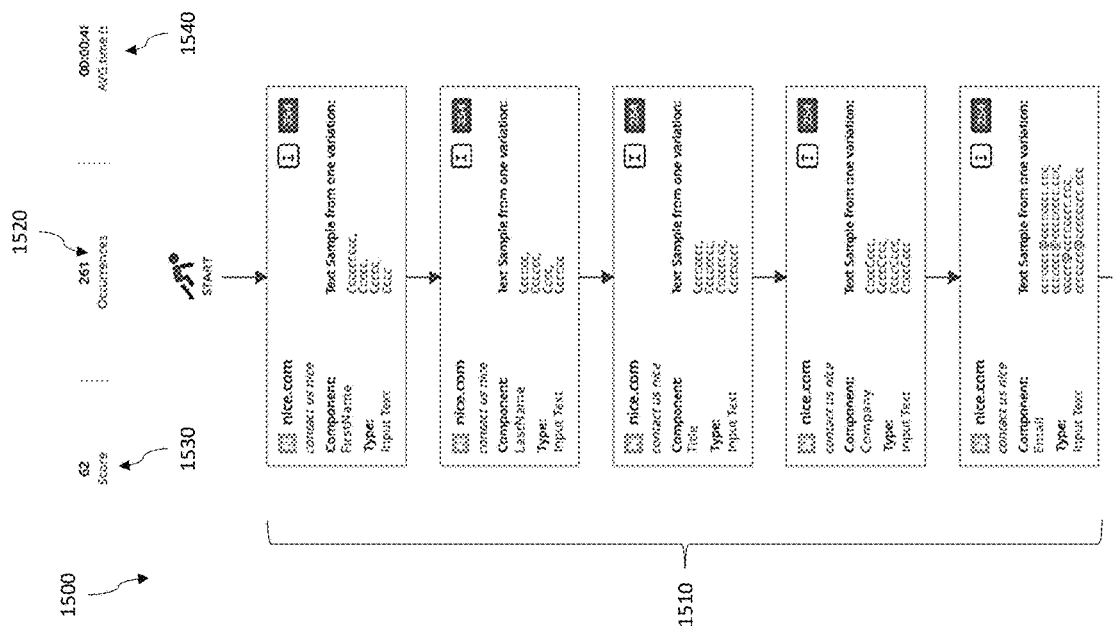
FIG. 15 is an example screen display of a sentence containing actions, in accordance with at least one embodiment of the present disclosure.
Figure 16:
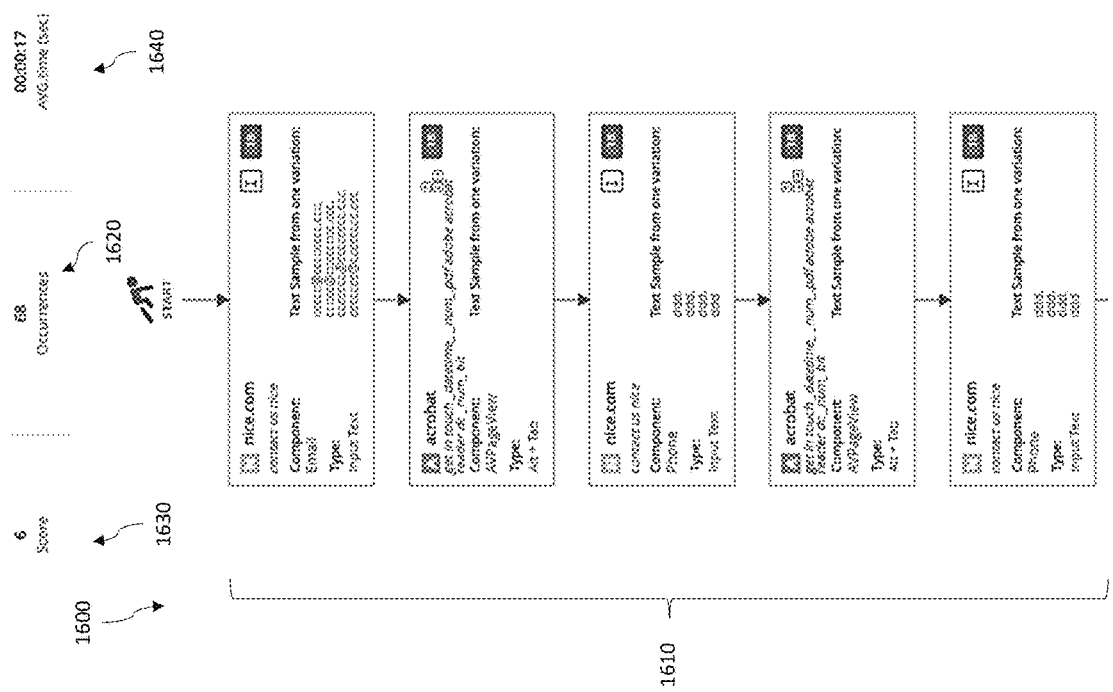
FIG. 16 is an example screen display of a sentence containing actions, in accordance with at least one embodiment of the present disclosure.

The following screenshots display the main differences and benefits in this invention in terms of before (FIGS. 13 and 14) and after (FIGS. 15 and 16, for a special type of routine called Search. A Search routine may for example require a minimum usage time along with either at least one copy or scroll action.

Figure 13:
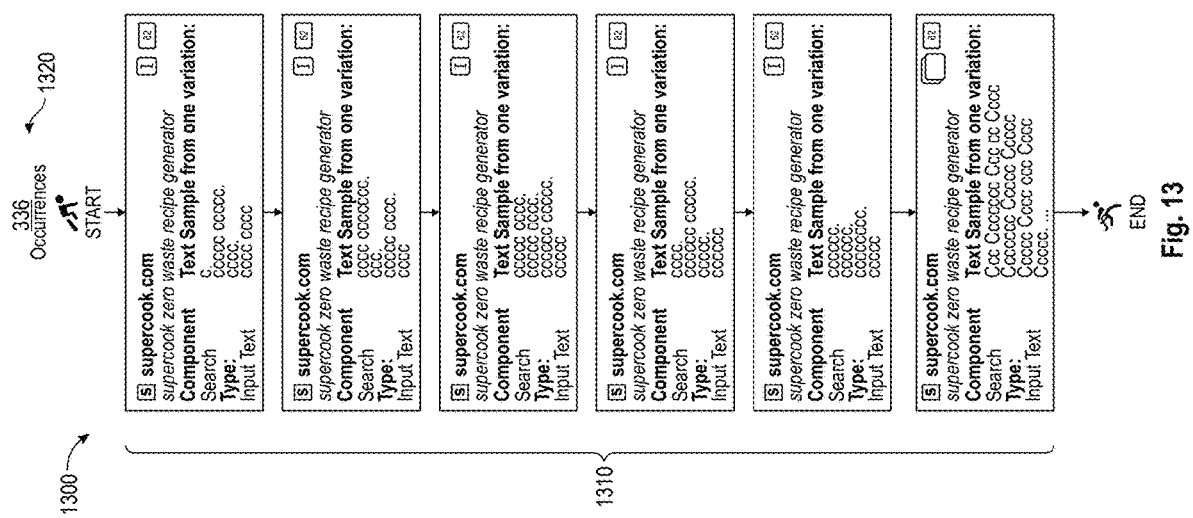
FIG. 13 is an example screen display of a sentence containing actions, in accordance with at least one embodiment of the present disclosure.

FIG. 13 is an example screen display of a sentence 1300 containing actions 1310, in accordance with at least one embodiment of the present disclosure. In the example shown in FIG. 13, each of the actions 1310 was taken on a website called supercook.com. Five of the actions 1310 are text input actions, and one is a Control-C action. Also visible is a number-of-occurrences counter 1320, which in this case indicates that this sentence occurs 336 times in the pool of accepted sentences, and may therefore be a good candidate for a new automation routine.

FIG. 14 is an example screen display of a sentence 1400 containing actions 1410, in accordance with at least one embodiment of the present disclosure. In the example shown in FIG. 14, six of the actions 1410 were taken on a website called supercook.com, and two were taken in the Microsoft Excel application. Also visible is a number-of-occurrences counter 1420, which in this case indicates that this sentence occurs 351 times in the pool of accepted sentences, and may therefore be a good candidate for a new automation routine.

FIG. 15 is an example screen display of a sentence 1500 containing actions 1510, in accordance with at least one embodiment of the present disclosure. Also visible is a number-of-occurrences counter 1320, which in this case indicates that this sentence occurs 261 times in the pool of accepted sentences, a score indicator 1530 showing a score of 62, and an elapsed time indicator 1540 showing that this sentence took 41 seconds to complete. These values indicate that this sentence may be a good candidate for a new automation routine.

FIG. 16 is an example screen display of a sentence 1600 containing actions 1610, in accordance with at least one embodiment of the present disclosure. Also visible is a number-of-occurrences counter 1620, which in this case indicates that this sentence occurs only 68 times in the pool of accepted sentences, a score indicator 1630 showing a score of 6, and an elapsed time indicator 1540 showing that this sentence took only 17 seconds to complete. These values indicate that this sentence may not be a good candidate for a new automation routine.

The identified new possible routines-types are potential automations. Automations are composed of actions, translated from the automation finder tool, as a set of corresponding objects inside the automation studio tool (see FIGS. 3A and 3B). These representations can then be transformed into code (e.g., a set of instructions and logic that the processor then executes at runtime as a dynamic linked library interacting with various applications withing the enterprise). The method may include transmitting an instruction to one or more remote computers based on one or more of the automation routines, the instruction to automatically execute at least one computer operation on one or more of the remote computers. Automation routines and/or action sequences, as well as individual computer operations, may be automatically executed on a remote computer, or by a plurality of remote computers, based on an instruction sent or transmitted by embodiments of the invention. For example, based on the example action sequence provided, embodiments may produce or provide an automation data item formatted as a table or as a JSON object.

Figure 17:
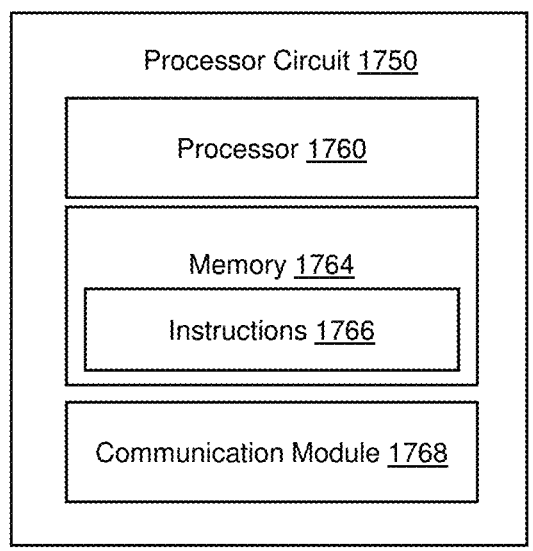
FIG. 17 is a schematic diagram of a processor circuit, in accordance with at least one embodiment of the present disclosure.

FIG. 17 is a schematic diagram of a processor circuit 1750, in accordance with at least one embodiment of the present disclosure. The processor circuit 1750 may be implemented in the system 100, or other devices or workstations (e.g., third-party workstations, network routers, etc.), or on a cloud processor or other remote processing unit, as necessary to implement the method. As shown, the processor circuit 1750 may include a processor 1760, a memory 1764, and a communication module 1768. These elements may be in direct or indirect communication with each other, for example via one or more buses.

The processor 1760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1760 may also include another hardware device, a firmware device, or any combination thereof configured to perform the operations described herein. The processor 1760 may also be implemented as a combination of computing devices, e.g., a combination of a DSP and a microprocessor, a plurality of microprocessors, one or more microprocessors in conjunction with a DSP core, or any other such configuration.

The memory 1764 may include a cache memory (e.g., a cache memory of the processor 1760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and nonvolatile memory, or a combination of different types of memory. In an embodiment, the memory 1764 includes a non-transitory computer-readable medium. The memory 1764 may store instructions 1766. The instructions 1766 may include instructions that, when executed by the processor 1760, cause the processor 1760 to perform the operations described herein. Instructions 1766 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1768 can include any electronic circuitry and/or logic circuitry to facilitate direct or indirect communication of data between the processor circuit 1750, and other processors or devices. In that regard, the communication module 1768 can be an input/output (I/O) device. In some instances, the communication module 1768 facilitates direct or indirect communication between various elements of the processor circuit 1750 and/or the system 100. The communication module 1768 may communicate within the processor circuit 1750 through numerous methods or protocols. Serial communication protocols may include but are not limited to United States Serial Protocol Interface (US SPI), Inter-Integrated Circuit ($I^2C$), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or agent actions) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, certain types of automation routines may be difficult to identify using current pattern mining techniques. Accordingly, it can be seen that the automation routine type mining system fills a long-standing need in the art, by pre-processing and screening the database of agent actions to yield a pool of sentences that appear to be relevant for the type of routine requested by the user.

A number of variations are possible on the examples and embodiments described above. For example, other types of routines could be searched for instead of or in addition to the types described herein, including but not limited to customer onboarding, order processing, surveys and feedback collection, and complaint handling. Other types of constraints may be used, and other types of agent actions may be recorded and analyzed. The technology described herein may be applied not only to call centers and other contact centers, but to any field where one or more agents engage in potentially repetitive tasks that lend themselves to automation.

Accordingly, the logical operations making up the embodiments of the technology described herein are referred to variously as operations, steps, objects, elements, components, or modules. Furthermore, it should be understood that these may occur, be performed or arranged, in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the automation routine type mining system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the automation routine type mining system as defined in the claims. Although various embodiments of the claimed subject matter have been described above with a certain degree of particularity, or with reference to one or more individual embodiments, those of ordinary skill in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system adapted to automatically create new automation routines, the system comprising:
    a fraud management server and a non-transitory computer readable medium operably coupled thereto, the computer readable medium comprising a plurality of instructions stored in association therewith that are accessible to, and executable by, the fraud management server, to perform operations which comprise:

over a period of time, storing a plurality of user inputs inputted into a user interface by a plurality of agents, wherein the user inputs occur within a plurality of applications; and in near-real time:

from the stored plurality of user inputs, automatically identifying and storing a repeating pattern of user inputs, wherein the user inputs of the repeating pattern of user inputs take place in a subset of the plurality of applications;

from the stored plurality of user inputs, automatically constructing and storing a binary vector, each position within the binary vector comprising a 1 for an occurrence of any user input within any application of the subset of the plurality of applications, and a 0 for a non-occurrence of any user input within any application of the subset of the plurality of applications;

from the binary vector, the repeating pattern of user inputs, and a look-ahead window of a specified number of user inputs, automatically extracting and storing a sentence, wherein the sentence comprises at least one user input within at least one application of the subset of the plurality of applications;

based on the repeating pattern of user inputs, an application type of an application of the subset of the plurality of applications, or a business goal associated with the repeating pattern of user inputs, creating a constraint;

in response to the sentence meeting the constraint, accepting the sentence;

in response to the sentence being accepted, adding the sentence to a pool of accepted sentences;

from the pool of accepted sentences, identifying a pattern of occurrences of the accepted sentence;

from the pattern of occurrences of the accepted sentence, creating a new automation routine usable by a user to replace a sequence of user inputs into the user interface; and reporting, to a user, via a display in communication with the fraud management server, the new automation routine.

2. The system of claim 1, wherein the routine is a search routine, a document processing routine, or a focused routine.

3. The system of claim 1, wherein the pattern of occurrences comprises a number of times the sentence has been used, a number of agents using the sentence, or the number of times the application has been used.

4. The system of claim 1, wherein the constraint comprises constraint properties comprising an item constraint, a length constraint, a price constraint, a return on investment constraint, a non-empty sentence constraint, an application usage time constraint, a number of times switching between applications constraint, a number of copy user inputs constraint, a number of scroll user inputs constraint, a number of text input user inputs constraint, or combinations of any of the foregoing.

5. The system of claim 1, wherein the constraint comprises a constraint metric comprising an average, a median, a percentage, a minimum, a maximum, a sum, a count, or a duration, wherein the constraint metric is compared against a configurable threshold.

6. The system of claim 1, wherein the operations further comprise converting the new automation routine into code.

7. The system of claim 6, wherein the operations further comprise making the code available on an automation finder application.

8. The system of claim 1, wherein extracting the sentence involves identifying start points and end points of the sentence based on a maximum number of 1s, a minimum number of 1s, an average number of 1s, or based on a maximum number of 0s, a minimum number of 0s, or an average number of 0s, or based on the look-ahead window of the specified number of user inputs.

9. The system of claim 1, wherein creating the constraint involves evaluating, for each user input within the sentence, the values of constraint properties against constraint metrics, and creating a Boolean expression of the evaluations, wherein the Boolean expression comprises the constraint.

10. The system of claim 1, wherein determining whether the sentence meets the constraint involves matching user inputs within the sentence to parameters of the constraint.

11. A computer-implemented method adapted to automatically create new automation routines, which method comprises:

with a fraud management server having a memory:

over a period of time, storing a plurality of user inputs inputted into a user interface by a plurality of agents, wherein the user inputs occur within a plurality of applications; and in near-real time:

from the stored plurality of user inputs, automatically identifying and storing a repeating pattern of user inputs, wherein the user inputs of the repeating pattern of user inputs take place in a subset of the plurality of applications;

from the stored plurality of user inputs, automatically constructing and storing a binary vector, each position within the binary vector comprising a 1 for an occurrence of any user input within any application of the subset of the plurality of applications, and a 0 for a non-occurrence of any user input within any application of the subset of the plurality of applications;

from the binary vector, the repeating pattern of user inputs, and a look-ahead window of a specified number of user inputs, automatically extracting and storing a sentence, wherein the sentence comprises at least one user input within at least one application of the subset of the plurality of applications;

based on the repeating pattern of user inputs, an application type of an application of the subset of the plurality of applications, or a business goal associated with the repeating pattern of user inputs, creating a constraint;

in response to the sentence meeting the constraint, accepting the sentence;

in response to the sentence being accepted, adding the sentence to a pool of accepted sentences;

from the pool of accepted sentences, identifying a pattern of occurrences of the accepted sentence;

from the pattern of occurrences of the accepted sentence, creating a new automation routine usable by a user to replace a sequence of user inputs into the user interface; and reporting, to a user, via a display in communication with the fraud management server, the new automation routine.

12. The method of claim 11, wherein the routine is a search routine, a document processing routine, or a focused routine.

13. The method of claim 11, wherein the pattern of occurrences comprises a number of times the sentence has been used, a number of agents using the sentence, or the number of times the application has been used.

14. The method of claim 11, wherein the constraint comprises constraint properties comprising an item constraint, a length constraint, a price constraint, a return on investment constraint, a non-empty sentence constraint, an application usage time constraint, a number of times switching between applications constraint, a number of copy user inputs constraint, a number of scroll user inputs constraint, a number of text input user inputs constraint, or combinations of any of the foregoing.

15. The method of claim 11, wherein the constraint comprises a constraint metric comprising an average, a median, a percentage, a minimum, a maximum, a sum, a count, or a duration, wherein the constraint metric is compared against a configurable threshold.

16. The method of claim 11, further comprising converting the new automation routine into code.

17. The method of claim 16, further comprising making the code available on an automation finder application.

18. The method of claim 11, wherein extracting the sentence involves identifying start points and end points of the sentence based on a maximum number of 1s, a minimum number of 1s, an average number of 1s, or based on a maximum number of 0s, a minimum number of 0s, or an average number of 0s, or based on the look-ahead window of the specified number of user inputs.

19. The method of claim 11, wherein creating the constraint involves evaluating, for each user input within the sentence, the values of constraint properties against constraint metrics, and creating a Boolean expression of the evaluations, wherein the Boolean expression comprises the constraint.

20. The method of claim 11, wherein determining whether the sentence meets the constraint involves matching user inputs within the sentence to parameters of the constraint.

* * * * *